United States Patent [19]
de Boer

[11] Patent Number: 6,030,915
[45] Date of Patent: Feb. 29, 2000

[54] PROCESS FOR PREPARING A LARGE PORE HYDROPROCESSING CATALYST

[75] Inventor: Mark de Boer, Amersfoort, Netherlands

[73] Assignee: Akzo Nobel N.V., Arnhem, Netherlands

[21] Appl. No.: 08/814,145

[22] Filed: Mar. 10, 1997

Related U.S. Application Data

[60] Provisional application No. 60/013,230, Mar. 11, 1996.

[30] Foreign Application Priority Data

Mar. 11, 1996 [EP] European Pat. Off. .............. 96200656

[51] Int. Cl.$^7$ .............................. B01J 20/34; B01J 23/16
[52] U.S. Cl. ................................ 502/39; 502/20; 502/34; 502/38; 502/313; 502/315
[58] Field of Search ................................ 502/20, 34, 38, 502/39, 313, 315

[56] References Cited

U.S. PATENT DOCUMENTS 4,888,316  12/1989  Gardner et al. ........................... 502/20

OTHER PUBLICATIONS

*European Search Report*, dated Jul. 17, 1996.

*Primary Examiner*—Elizabeth D. Wood
*Attorney, Agent, or Firm*—Louis A. Morris

[57] ABSTRACT

The present invention relates to a process for preparing a hydroprocessing catalyst comprising the steps of subjecting a spent hydroprocessing catalyst comprising carbonaceous and sulphurous deposits to a thermal treatment to remove at least part of said deposits, grinding the thus obtained spent catalyst, mixing the ground hydroprocessing catalyst with at least one additive, and shaping the mixture of additive and ground hydroprocessing catalyst to form particles of a new hydroprocessing catalyst, with the spent hydroprocessing catalyst being subjected to a high-temperature calcination step carried out at a temperature in the range of 550–1000° C. for a period sufficient to increase the MPD of the spent catalyst by at least 0.5 nm.

The process according to the invention is particularly suitable for preparing ebullated bed catalysts from spent hydroprocessing catalysts.

7 Claims, 1 Drawing Sheet

PROCESS FOR PREPARING A LARGE PORE HYDROPROCESSING CATALYST

The present application claims benefit of U.S. Provisional application Ser. No. 60/013,230 filed on Mar. 11, 1996 under 35 U.S.C. §119.

FIELD OF THE INVENTION

The present invention pertains to a process for preparing a large pore hydroprocessing catalysts from spent small pore hydroprocessing catalyst. The present invention additionally pertains to the large-pore hydroprocessing catalyst thus obtained, and to the use thereof in the hydroprocessing of hydrocarbon feeds.

BACKGROUND OF THE INVENTION

In petroleum refining, there is large-scale use of catalysts in the hydroprocessing of hydrocarbon feeds to remove contaminants, such as sulphur-containing compounds, nitrogen-containing compounds, and, optionally, contaminant metals, such as nickel, vanadium, and iron. Apart from removing contaminants, hydroprocessing may also effect some hydrocracking of the feedstock to compounds with a lower boiling point. The catalysts used in these processes are well-known in the art. They generally consist of a Group VI hydrogenation metal component, e.g., molybdenum or tungsten, and a Group VIII hydrogenation metal component, e.g., cobalt or nickel, on a refractory oxide carrier. The oxidic support generally consists of alumina, optionally mixed with other components, such as silica, silica-alumina, magnesia, titania or mixtures thereof. The catalyst may additionally comprise other components, such as phosphorus.

During the hydroprocessing of hydrocarbon feeds, the activity of the catalyst decreases. This is caused, int. al., by the accumulation on the catalyst surface of carbonaceous and sulphurous deposits, which are generally referred to as coke. The accumulation of these deposits is detrimental to the activity of the catalyst. Therefore, a coked-up catalyst is commonly regenerated after a certain period of use by burning off the coke, which renders the catalyst suitable for reuse. However, this process of use and regeneration by coke removal cannot be kept up indefinitely. This is because during the use of the catalyst other, irreversible, processes also take place which detrimentally affect the catalyst's activity. For example, the dispersion of the hydrogenation metals through the catalyst composition decreases during use, which leads to a catalyst with decreased activity. Further, if the catalyst is used for the hydroprocessing of feedstocks containing contaminant metals such as vanadium, nickel, and iron, contaminant metal deposits will form upon the catalyst. Additionally, during catalyst use, the particle strength and the length of the particles decreases. Thus, in the life of each hydroprocessing catalyst there comes a time when regeneration by coke removal is not sufficient to regain a catalyst with sufficient catalytic activity, and the catalyst must be replaced. The so-called spent hydroprocessing catalyst then has to be disposed of.

One way of disposing of spent hydroprocessing catalyst is by landfilling, but this is becoming increasingly difficult because of environmental constraints. Catalysts used for the hydroprocessing of metals-containing hydrocarbon feeds, which will thus contain contaminant metals such as vanadium, nickel, and iron in addition to the hydrogenation metals, may be disposed of to a metals reclaimer, who will reclaim not only the hydrogenation metals but also the contaminant metals. Obviously, metals reclaimers are primarily interested in spent catalysts containing substantial amounts of contaminant metals, and far less so in catalysts which have been used for the hydroprocessing of lighter feedstocks and so contain no or hardly any contaminant metals. This means that it is even more difficult to dispose of spent hydroprocessing catalysts used for hydroprocessing lighter feedstocks than of hydroprocessing catalysts used for hydroprocessing heavy feedstocks. In any case, both landfilling and metals reclaiming are expensive.

Another option which has been considered in the art is the reuse of spent catalyst to form new catalyst compositions. Such a process is known from U.S. Pat. No. 4,888,316, in the name of Phillips Petroleum Company. In this reference a process is described in which a substantially dry spent hydroprocessing catalyst comprising hydrogenation metals, a support material, and coke is ground. The ground product is mixed with an alumina-containing binder, after which the mixture is shaped. The shaped particles are subsequently subjected to a temperature treatment to remove the coke from the catalyst composition. In a specific embodiment, the decoked particles are subsequently subjected to a high-temperature calcination step which is carried out in such a manner that the resulting catalyst composition has a larger portion of pores in the 5–60 nm range than the product obtained after the removal of carbonaceous deposits. Said high-temperature calcination step is preferably carried out at a temperature of 593–927° C. (1100–1700° F.). The drawback to the process described in this reference is that it requires facilities for handling coke-containing catalyst dust not present in a normal hydroprocessing manufacturing plant. It also requires additional precautions in respect of health, safety and environmental (HSE) hazards. Further, it was found that the catalyst obtained by the process described in this reference does not show adequate strength for it to be used in a commercial process, nor is the homogeneity of the catalyst sufficient.

The purpose of the present invention is to provide a process for preparing a large-pore hydroprocessing catalyst from spent hydroprocessing catalyst by which a catalyst is obtained which does show adequate strength and homogeneous quality, and which can be produced without the need for additional equipment or HSE measures for handling coke-containing catalyst dust.

SUMMARY OF THE INVENTION

The present invention generally relates to a process for preparing a large pore hydroprocessing catalyst from spent small pore hydroprocessing catalyst. The process comprises thermally treating a hydroprocessing catalyst comprising at least one hydrogenation metal component on a support comprising at least 50% alumina and which contains carbonaceous and sulphurous deposits at a temperature of 200°–600° C. in an oxidising atmosphere for a time sufficient to remove at least a part of the carbonaceous and sulphurous deposits therefrom; grinding said catalyst to form particles of 300 microns or less; mixing the ground particles with at least one additive; and, mixing and shaping the mixture to form a new hydroprocessing catalyst. Additionally, in at least one step of the process, the catalyst is subjected to a high temperature calcination step in order to increase the MPD of the spent catalyst by at least 0.5 nm.

DETAILED DESCRIPTION OF THE INVENTION

Figure 1:
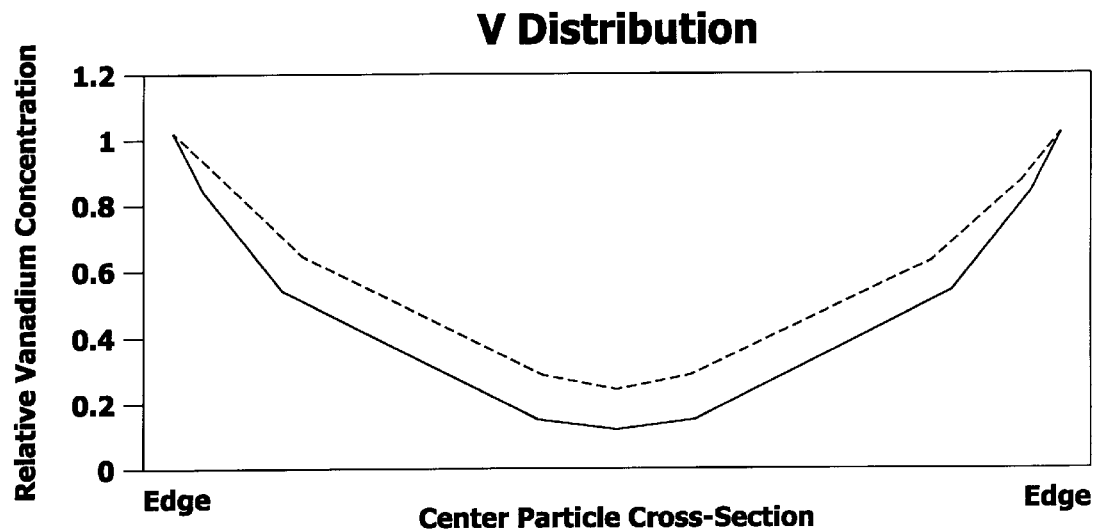
Figure 2:
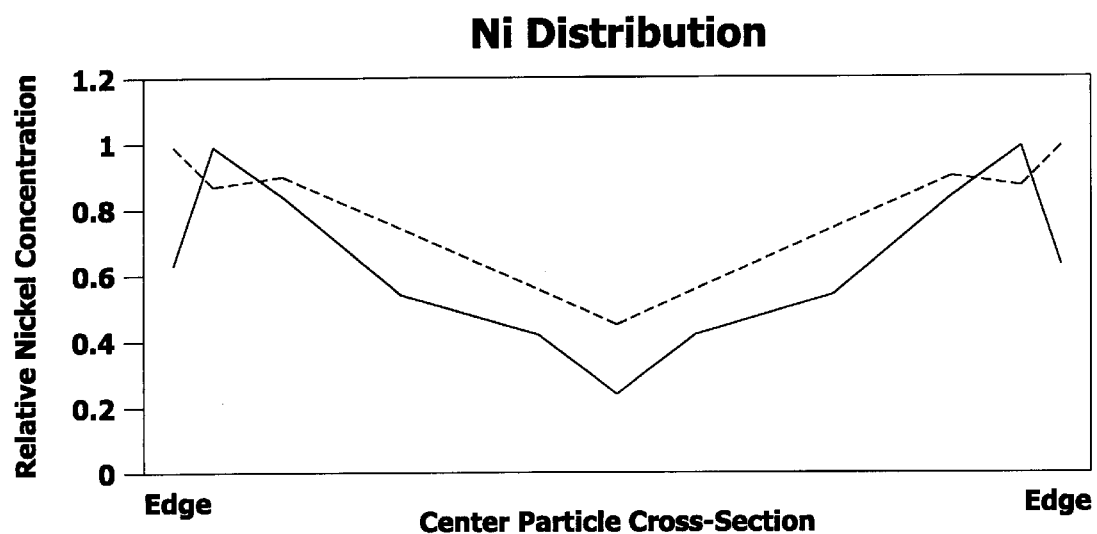

The process according to the invention generally comprises the following steps:

(a) a hydroprocessing catalyst comprising at least a hydrogenation metal component on a support comprising at least 50 wt. % of alumina and carbonaceous and sulphurous deposits is subjected to a thermal treatment at a temperature in the range of 200° to 600° C. in an oxidising atmosphere to remove at least part of the carbonaceous and sulphurous deposits from the catalyst, (b) the hydroprocessing catalyst from which at least part of the carbonaceous and sulphurous deposits have been removed is ground to form particles with a particle size of 300 microns or less, (c) the ground hydroprocessing catalyst is mixed with at least one additive, (d) the mixture of additive and ground hydroprocessing catalyst is shaped to form particles of a new hydroprocessing catalyst, with the product of at least one of the steps (a) through (d) being subjected to a high-temperature calcination step in order to increase the MPD of the spent catalyst by at least 0.5 nm, as determined from the mercury intrusion curve determined at a contact angle of 140°.

In the context of the present specification the abbreviation MPD stands for mean pore diameter, which, for a catalyst with a monomodal pore size distribution, is defined as the pore diameter at which 50% of the total pore volume is present in pores with a pore diameter below this value and 50% of the total pore volume is present in pores with a pore diameter above this value. The spent catalysts used as starting material are usually monomodal catalysts with substantially no macropore volume. Depending on the catalyst composition, the preparation procedure, and the additives used in preparing the new hydroprocessing catalyst, the new catalyst may be a bimodal catalyst with a substantial amount of macropore volume. In that case, the term MPD should be understood to be the mean pore diameter of the catalyst excluding the macropores. The MPD can then be defined as the pore diameter at which 50% of the pore volume present in pores with a pore diameter between 3.6 and 100 nm is present in pores with a pore diameter below the MPD, and 50% of the pore volume present in pores with a diameter between 3.6 and 100 nm is present in pores with a pore diameter above the MPD. This value is also indicated as micro-MPD. The MPD of the starting material spent catalyst is determined after removal of the carbonaceous and sulphurous deposits therefrom.

The process of the present invention hinges upon two characterising features.

In the first place, it is essential to the process according to the invention that the spent catalyst be subjected to said thermal treatment to remove at least part of the carbonaceous and sulphurous deposits, say, at least 50 wt. %, preferably at least 80 wt. %, more preferably at least 95 wt. %, that is, substantially all of the carbonaceous and sulphurous deposits from the catalyst before it is processed further. This is for the following reasons. The spent catalyst may contain up to 25 wt. % of carbonaceous deposits, calculated as carbon on the weight of the total spent catalyst, and will additionally contain a substantial amount of sulphur. If the removal of the carbonaceous and sulphurous deposits were to be carried out after the spent catalyst had been ground and shaped, as takes place in U.S. Pat. No. 4,888,316 cited above, the presence of carbon and sulphur would detrimentally affect the binding properties of the binder, leading to a newly formulated catalyst of insufficient strength. Further, the carbon and the sulphur content of spent catalyst vary from source to source. If one were to start from material from which the carbonaceous and sulphurous deposits had not been removed, these inhomogeneities in the starting material would be reflected in an end product of inhomogeneous quality. Moreover, the grinding of catalyst containing carbonaceous and sulphurous deposits is a hazardous operation, because spent catalyst containing these materials is pyrophoric (self-heating). Further, as has been indicated before, hydroprocessing manufacturers do not have equipment for processing coke-containing ground catalyst, while the ground hydroprocessing catalyst from which the coke has been removed before grinding can be processed in the same way as normal catalyst dust. No additional HSE measures are necessary either.

In the second place, the high temperature calcination step is essential to the process according to the invention. This step is carried out to improve the accessibility of the hydroprocessing catalyst by enlarging its MPD by at least 0.5 nm, preferably at least 1 nm, more preferably at least 1.5 nm, which is essential for the following reason. As has been explained earlier, during use of a hydroprocessing catalyst the dispersion of the hydrogenation metals is detrimentally affected, resulting in less active metal being available for the catalytic reaction. Since the activity of a catalyst which has been used for the hydrodesulphurisation and hydrodenitrogenation of hydrocarbon feeds decreases directly with the amount of available active metal, the spent form of such a catalyst is less suitable for effecting mainly hydrodesulphurisation and hydrodenitrogenation. The amount of available metal on this type of spent catalyst is quite sufficient for hydrodemetallisation purposes, but hydrodemetallisation requires a larger MPD than hydrodesulphurisation and hydrodenitrogenation. Thus, a spent catalyst which has been used essentially for the hydrodesulphurisation and/or hydrodenitrogenation of hydrocarbon feeds could be made suitable for use in hydrodemetallisation if its MPD were increased. This MPD increase is effected by the high-temperature calcination step in the process according to the invention.

Not wishing to be bound by theory, it is submitted that the effect of this treatment can be explained as follows. When an alumina-containing particle is subjected to a high temperature treatment, the alumina starts to sinter. In this sintering process, the surface area of the particle decreases. Because the pore volume, which can be described as the inclusive volume of the particle, remains substantially the same upon sintering of the alumina, apart from a limited shrinkage, the MPD of the alumina-containing particle increases correspondingly. Because the effect of increased MPD is dependent on the presence of alumina in the spent hydroprocessing catalyst, the support of the spent catalyst should comprise at least 50 wt. % of alumina, preferably at least 80 wt. %, more preferably at least 90 wt. %.

Now that the general outline of the process according to the invention has been given above, the various process steps will be discussed in more detail below.

The first step (a) in the process according to the invention is the thermal treatment of the spent hydroprocessing catalyst in order to remove coke. Said thermal treatment is carried out by heating the spent catalyst to a temperature between 200° and 600° C., preferably between 400° and 550° C., for a period of 0.1 to 48 hours, preferably between 0.5 and 12 hours. The heating is carried out in an oxygen-containing atmosphere. In this step, the carbonaceous deposits present on the catalyst particles are oxidised to carbon oxides (CO and $CO_2$). Further, the sulphurous deposits which were deposited on the catalyst during its previous use are converted to sulphur oxides ($SO_2$ and $SO_3$), while the sulphides of the hydrogenation metals, resulting from the sulphidation step to which the catalyst is subjected to activate it, are converted to metal oxides. The terms removal of carbonaceous and sulphurous deposits and decoking are meant to encompass all processes indicated above, as well as any other processes which may take place in the catalyst during the thermal treatment of step (a).

In the following step (b), the catalyst which has been subjected to a thermal treatment as described above is ground, and the fraction with a particle size below 300 micrometer, preferably below 150 micrometer, more preferably below 50 micrometer, more preferably still below 20 micrometer, is isolated, for example by appropriate sieving techniques. The grinding can take place, e.g., in a conventional hammer mill. In the context of this specification the term particle size refers to the value for the D50, which is the particle size at which 50 vol. % of the particles has a particle size above this value and 50 vol. % has a particle size below this value.

In step (c), the ground catalyst is combined with at least one additive, which may be a binder and/or an additional additive. A binder may be used to glue the various catalyst components together. The additive is present either as low-cost filler or as a means of providing the catalyst with specific properties. It is of course impossible to make a clear distinction between binders and additives, given that the compound added as an additive may also have some binding properties, while the compound added as a binder will also function as diluent and may provide the catalyst with additional properties. Examples of suitable binders are alumina, silica, silica-alumina, titania, and (synthetic) clays. Alumina is the obvious choice as binder, as it is well known for its binding properties and can be easily kneaded, but other materials may also be used. Examples of suitable additives are silica-alumina, diatomaceous earth, sepiolite, bauxite, (spent) FCC catalyst, or other (spent) catalyst, and natural or synthetic clays such as kaolin and acid-leached kaolin.

In step (d), the mixture comprising the ground catalyst and at least one additive is shaped into particles. This is done by procedures known in the art, such as extrusion, granulation, beading, tablet pressing, pill making, bricketing, etc. The size of the particles will depend on the use envisaged for the newly formulated catalyst. If the catalyst is intended for use in fixed bed operations, the particles will have a diameter in the range of 0.5 to 10 mm. If it is intended for use in moving bed processes, the particle size will typically be below 3 mm, preferably in the range of 0.5 to 1.5 mm. The shape of the newly formulated catalyst particles is variable. Suitable shapes are cylinders, beads, rings, and symmetrical and asymmetrical polylobes, such as tri- or quadrulobes.

The high-temperature calcination step, which is carried out to increase the MPD of the spent catalyst as determined by mercury intrusion by at least 0.5 nm, is carried out at a temperature of 550–1000° C. over a period sufficient to effect said increase in MPD, generally over a period of 5 minutes to 48 hours. It may be carried out in a dry atmosphere or in a (partial) steam atmosphere. In the former case the temperature will be in the range of 600–1000° C., in the latter in the range of 550–1000° C. As has been explained before, the increase in MPD will be accompanied by a decrease of the surface area. Because the surface area is relevant to the catalytic activity of the catalyst, and the MPD to its accessibility, the catalyst to be prepared has an optimum MPD, which optimum will depend heavily upon the feed for which the catalyst to be prepared is to be used.

In general, a higher temperature will result in a higher increase in MPD. The time during which the high-temperature calcination step is carried out is, int. al., dependent on the particle size of the particles subjected to the high-temperature calcination treatment. If the particles are large, a longer calcination time will generally be necessary to increase the MPD of the particles to the desired value. It is well-known in the art that the presence of additional components, such as the hydrogenation metals and contaminant metals, increases the sintering rate of alumina. Further, the presence of additional materials, such as silica and titania, in the catalyst support lessens the sintering activity of the alumina, and therefore the increase in MPD. This is the reason why the support of the spent catalyst should comprise at least 50 wt. % alumina, preferably at least 80 wt. %, more preferably at least 90 wt. % for the increase in MPD to be properly effected. The above indicates that the amount of hydrogenation metals and contaminant metals present in the spent catalyst and its support composition should be taken into account in determining the conditions of the high-temperature calcination step, together with the MPD of the starting spent catalyst, its particle size, and the desired MPD of the catalyst to be produced.

As the person skilled in the art will understand, the selection of the calcination temperature will be a trade-off between deactivation of the catalyst by sintering of the hydrogenation metals and pore widening by support sintering in which the above-mentioned variables should be taken into account. On the basis of the above indications it is within the scope of the person skilled in the art to determine the exact calcination conditions in specific circumstances.

The high-temperature calcination step can be carried out after each one of the process steps (a) through (d) discussed above. However, some of these embodiments are more advantageous than others. More in particular, it is possible to calcine the ground decoked catalyst obtained after step (b). This has the advantage that the calcination time can be decreased as compared with the calcination of complete extrudates, but the calcination of catalyst with a particle size of less than 300 microns will generally be accompanied by such extensive dusting problems that this embodiment is generally less preferred. In the same way it is possible to carry out the high-temperature calcination step upon the product obtained in step (c), that is, the product obtained by formulating the ground decoked spent catalyst with additive and binder. This embodiment will show the same dusting problems accompanying the calcination after step (b), but in addition the high-temperature calcination step may detrimentally affect the binding properties of the binder as such, thus resulting in a final catalyst with decreased strength. This embodiment is generally not preferred either. The two preferred embodiments of the process according to the invention therefore are those in which either the decoked product of step (a) or the shaped product of step (d) is subjected to the high-temperature calcination step. An alternative procedure also covered by the present invention is the combination of the decoking step (a) and the high-temperature calcination step. In that case, the catalyst is subjected to a decoking step at a temperature sufficient to increase the MPD of the spent catalyst with at least 0.5 nm. However, this embodiment is not preferred. The most preferred embodiment of the process according to the invention is the process in which the product of step (d) is subjected to the high-temperature calcination step, particularly if an alumina-containing binder is used. This is for the following reason. When the catalyst is subjected to a high-temperature calcination step to enlarge its MPD, thus improving its accessibility before it is formulated with the binder, the binder may clog up part of the thus obtained larger pores, so undoing part of the improved accessibility. On the other hand, if the catalyst is subjected to the high-temperature calcination step after being formulated with, for example, an alumina-containing binder, i.e., after step (d), the alumina-containing binder will sinter with the spent catalyst, resulting in a final catalyst with improved accessibility both in the binder and in the spent catalyst.

The high-temperature calcination step is carried out to increase the MPD of the spent catalyst by at least 0.5 nm. Depending on the circumstances, this may or may not result in the final catalyst having an MPD which is at least 0.5 nm larger than the MPD of the original spent catalyst. For example, if a spent catalyst the MPD of which has been increased by a value of 1 nm or 2 nm by the high-temperature calcination step is mixed with a small-pore additive, the MPD of the final catalyst may well be the same as the MPD of the starting spent catalyst. On the other hand, if a spent catalyst is mixed with an additive having pores with a diameter in the range of 3.6 to 100 nm which are larger than the MPD of the spent catalyst, the MPD of the final catalyst will be increased more than the MPD of the spent catalyst. In general, the only process in which the MPD of the final catalyst is the same as the MPD of the calcined spent catalyst is one where the ground spent catalyst is mixed with an additive which shows the same sintering behaviour as the spent catalyst, the mixture is shaped, and the shaped mixture is subjected to the high-temperature calcination step.

The process of the invention is particularly suitable for the reuse of spent catalyst, that is, catalyst which has been deactivated by use in hydroprocessing. However, it is also useful in the case of catalyst which is still serviceable after normal regeneration. In the context of this specification the wording spent catalyst is meant to encompass both catalyst which was used until it was deactivated to such an extent that normal regeneration was no longer possible and catalyst which has been used but is still suitable for regenerating by normal regeneration procedures. As has been explained before, the catalyst support should comprise at least 50 wt. % of alumina. Apart from hydroprocessing catalysts, in which generally no specific cracking component is present, (mild) hydrocracking catalysts, which do comprise a cracking component, such as amorphous silica-alumina or a molecular sieve component, may also be used in the process of the invention, depending on the use envisaged for the newly formulated catalyst.

Various types of spent catalyst may be used in the process according to the invention. In fact, there is no limitation on the nature of the spent catalyst starting material other than that with an MPD enlarged by at least 0.5 nm it must still have catalytic activity. Catalysts which have been used in the hydroprocessing of light hydrocarbon feeds such as distillate feeds are most preferred for use in the process according to the invention. Catalysts which have been used in the hydroprocessing of vacuum gas oils, such as catalysts used in the pretreatment of FCC feedstocks and hydrocracking feedstocks, catalysts used in the demetallisation of vacuum gas oils, hydrocracking catalysts, and mild hydrocracking catalysts are also suitable for use, but due to their higher content of contaminant metals, they are less preferred than catalysts used for the hydroprocessing of distillates. Catalysts used in the downstream hydroprocessing of resid feeds may also be used in the process according to the invention, but due to their higher contaminant metals content and lower active metals content, they are less preferred than the catalysts used for hydroprocessing vacuum gas oils. In principle, catalysts used in the demetallisation of heavy feedstocks may also be used, but they are even less preferred. If so desired, mixtures of several types or batches of spent catalyst may also be used.

As indicated above, catalysts which have been used in the hydroprocessing of light hydrocarbon feeds are especially suitable as starting materials for the process according to the invention. These catalysts generally have a Group VI hydrogenation metals content in the range of 5–35 wt. %, calculated as trioxide, and a Group VIII hydrogenation metals content of 1–10 wt. %, calculated as oxide. The Group VI hydrogenation metal component generally is Mo or W. The Group VIII hydrogenation metal component generally is Ni or Co. The catalyst may optionally comprise phosphorus, which generally is present in an amount of 0–10 wt. %, calculated as P2O5. The catalyst support generally is alumina comprising a minor amount of silica, i.e., up to 20 wt. %. These catalysts generally have an MPD in the range of 5–15 nm. They generally contain up to 2 wt. % of contaminant metals, calculated as oxide. When this type of catalyst is used in the process according to the invention, the high-temperature calcination step ensures that the MPD of the spent hydroprocessing catalyst is enlarged to a value in the range of 6–25 nm, making the thus obtained catalyst especially suitable for use in the hydroprocessing of heavy metals-containing feedstocks. Preferably, in the process according to the invention a spent distillate hydroprocessing catalyst with an MPD of 6–9 nm is subjected to a high-temperature calcination step to increase its MPD to a value of 8–15 nm.

The amount of spent catalyst, binder, and optional additive will vary with the intended use of the catalyst. The binder is present to glue the spent catalyst particles together. The optional additive may function, for example, as a diluent for the metals content of the spent catalyst particles or to modify the properties of the catalyst to be produced, for example, its strength, its density, and its pore size distribution. The additive can also add specific catalytic properties to the catalyst, such as hydrocracking activity.

Generally speaking, it is envisaged to prepare with the process according to the invention catalysts suitable for use in fixed bed or moving bed processes which comprise 5–95 wt. % of spent catalyst and 95–5 wt. % of other components. A particularly attractive feature of the process according to the invention is that it makes it possible to prepare moving bed catalysts, particularly ebullated bed catalysts, which comprise 20–80 wt. % of spent hydroprocessing catalyst and 80–20 wt. % of binder and additives. In this case, the binder and additive will function as diluent for the high metals content of the hydroprocessing catalyst. In general, moving bed catalysts, and particularly ebullated bed catalysts, have a Group VI metals content in the range of 7–20 wt. %, calculated as trioxide, based on the weight of the catalyst, and a Group VIII metals content in the range of 1–10 wt. %, calculated as oxide, based on the weight of the catalyst. Further, the additive can be used to ensure that the new catalyst has a bulk density suitable for use in ebullated bed processes. The bulk density of the starting fixed bed hydroprocessing catalyst will generally be too high for an ebullated bed catalyst. The addition of a low-density additive, e.g., diatomaceous earth, sepiolite or kaolin, to the newly formulated catalyst composition will lead to a decreased bulk density, rendering the catalyst suitable for use in ebullated bed processes. If so desired, spent or fresh FCC catalyst, optionally after grinding, may be incorporated into the catalyst to be prepared by the process according to the invention. Amounts of up to 30 wt. %, calculated on the new catalyst, are envisaged. Spent FCC catalyst appears to increase the strength of the catalyst particles.

If so desired, additional hydrogenation metals may be added to the catalyst composition, e.g., by impregnating the newly formulated catalyst with an impregnation solution comprising water soluble salts of the hydrogenation metals to be incorporated into the catalyst composition. Other compounds of which the incorporation into the newly formulated catalyst composition may be desired, such as phosphorus, may also be incorporated into the catalyst composition by impregnation, either in combination with additional metals or separately. When the newly formulated catalyst is impregnated as such, a fair amount of hydrogenation metals will be adsorbed by the ground spent catalyst particles. If this should be objectionable, it is possible to contact the additive with hydrogenation metals or phosphorus before it is mixed with the ground spent catalyst particles. Alternatively, extra metals can be incorporated into the catalyst composition by mixing metals components, in the solid state or dissolved, with the mixture of ground calcined spent catalyst, binder, and, optionally, additive. This method is particularly attractive for solid molybdenum oxide. Of course, a combination of the two procedures is also possible.

Depending on its intended use it may be desirable to render the newly formulated catalyst, that is, the metal components present therein, sulphidic prior to the catalyst being used. This can be done in an otherwise conventional manner, say, by contacting the catalyst in the reactor at elevated temperature with hydrogen and a sulphur-containing feed, or with a mixture of hydrogen and hydrogen sulphide, or by separate presulphiding followed by activation. Generally, sulphidation is desirable when the catalyst is to be used in a fixed bed process, while generally no sulphidation will be carried out when the catalyst is to be used in a moving bed process, more particularly, an ebullated bed process.

The process according to the invention is particularly suitable for the production of catalysts for use in moving bed processes, more specifically, ebullated bed processes. In a moving bed process the catalyst particles and the feed are fully backmixed. For example, in a typical ebullated bed process, HRI's H-oil process, the feed and the hydrogen-containing gas with which the feed is to be treated are introduced at the bottom of a reactor containing an ebullated bed catalyst. Spent catalyst is withdrawn from the bottom of the reactor at regular intervals, while fresh catalyst is added to the top. This eliminates the need to shut down the plant for catalyst replacement. In the expanded moving bed, an intimate contact among the catalyst particles, the feed, and the hydrogen is effected by means of internal circulation. The moving bed technology has the advantage of being very flexible with regard to the nature of the feedstocks offered. Suitable feedstocks are, e.g., vacuum residua, atmospheric residua, and heavy crudes. The product will be, e.g., gasoline, light gas oil, vacuum gas oil, and atmospheric gas oil. One advantage of a moving bed process over a fixed bed process is the constant quality of the product obtained, because, unlike in a fixed bed process, there is no deactivation of the catalyst inventory as a function of time. Several types of moving bed processes, among them ebullated bed processes, are known in the art. Mention may be made of the above-mentioned H-oil process, Amoco/Lummus' LC-Fining process, and Chevron's OCR process. Moving bed processes are generally carried out at a temperature between 400° and 500° C., a pressure between 100 and 200 bar, and an H2/oil ratio of between 700 and 1400 Nl/l. The catalyst addition rate is generally in the range of 0.2–2 kilograms of catalyst per cubic meter of feed processed. It should be noted that the specific values for all these parameters, and in particular for the catalyst consumption, depend heavily on the nature of the feed, the nature of the catalyst, and the other process conditions.

EXAMPLE 1

This example describes the production of an ebullated bed catalyst with the process according to the invention.

The starting material was a spent hydrodesulphurisation catalyst comprising 10 wt. % of carbonaceous deposits, calculated as C, and 10.3 wt. % of sulphur, calculated as S. These were removed from the catalyst by subjecting it to a heat treatment at a temperature of 525° C. for a period of 10 hours in an oxygen-containing atmosphere. The thus obtained clean spent catalyst comprised 20 wt. % of Mo, calculated as trioxide, 5 wt. % of Co, calculated as oxide, 0.2 wt. % of V, calculated as oxide, and 0.1 wt. % of Ni, calculated as oxide, all based on the weight of the clean spent catalyst.

The catalyst was ground to a particle size of less than 20 micron. Then, 2970 grams of clean spent catalyst were mixed with 2489 grams of alumina. To the thus obtained mixture were added 15 grams of 54 wt. % nitric acid dissolved in 1500 grams of water, after which the thus obtained mixture was kneaded. After 12 minutes 250 grams of water were added, and the mixture was kneaded again. This action was repeated a few times, until the mixture was extrudable. The thus obtained mixture was extruded using a Welding extruder to form extrudates with a diameter of 1 mm. The extrudates were dried overnight in air at a temperature of 120° C.

The thus obtained dried extrudates were divided into two portions. One of the portions was calcined in air for 1 hour at a temperature of 600° C. This calcination treatment was not sufficient to enlarge the MPD of this comparative catalyst, which had an MPD of 8 nm. The other portion was calcined in air for a period of 1 hour at a temperature of 750° C. This catalyst according to the invention had an MPD of 12 nm.

Both catalysts comprised 13 wt. % of molybdenum, calculated as trioxide, and 3.2 wt. % of cobalt, calculated as oxide. Further properties of the two catalysts are given in the following Table.

|  | Comparative catalyst | Catalyst according to the invention |
| --- | --- | --- |
| micro-MPD (nm) | 8 | 12 |
| PV (Hg) (ml/g) | 0.63 | 0.67 |
| PV (>100 nm d) | 0.16 | 0.18 |
| CBD g/ml | 0.59 | 0.59 |

The catalyst according to the invention and the comparative catalyst prepared as described above were tested in a fixed bed residue desulphurisation test. They were compared with a commercially available ebullated bed catalyst comprising 12.9 wt. % of molybdenum, calculated as trioxide, and 4.1 wt. % of cobalt, calculated as oxide. The commercially available ebullated bed catalyst had a CBD of 0.58 ml/g and an MPD of 7 nm.

The test was executed in an upflow tubular reactor, with the two catalysts being tested side by side. Two reaction tubes were filled with 75 ml of catalyst homogeneously intermixed with 80 ml of carborundum particles. After the catalysts had been presulphided using an SRGO in which dimethyl sulphide had been dissolved to an S content of 2.5 wt. %, a preheated Kuwait vacuum gas oil was passed over the catalyst for a period of one day. Then, a Kuwait atmospheric residue with the properties given in Table 1 was passed over the catalyst.

TABLE 1

Properties of kuwait atmospheric residue

| | |
|---|---|
| Nitrogen (ASTM D-4629) | 2183 mg/kg |
| Sulphur (ASTM D-4294) | 3.964 wt. % |
| Density 50° C. (ASTM D-4052) | 0.9525 g/ml |
| CCR (ASTM D-4530) | 12.08 wt. % |
| Ni (IP-288) | 10 mg/kg |
| V (IP-288) | 58 mg/kg |
| Vacuum Dist. (ASTM D-1160) | |
| IBP | 279° C. |
| 5 vol. % | 364° C. |
| 10 vol. % | 378° C. |
| 20 vol. % | 416° C. |
| 30 vol. % | 447° C. |
| 40 vol. % | 493° C. |
| 50 vol. % | 527° C. |
| 60 vol. % | NA |
| FBP | NA |

NA stands for not applicable (oil will decompose at temperatures above 527° C.)

The catalysts were tested for ten days at a temperature of 425° C., a pressure of 155.2 bar gauge, an LHSV of 1.0 h-1, and a hydrogen to oil ratio of 800 NI/l. After 10 days on stream the HDS, HDN, HDCCR, and HDM(Ni+V) were determined. In Table 2, the results thereof are given as relative volume activities (RVAs), with the activity of the comparative commercial catalyst being put at 100.

| | RVA Comparative catalyst | RVA Catalyst of invention |
|---|---|---|
| HDS | 100 | 104 |
| HDN | 103 | 101 |
| HDCCR | 97 | 104 |
| HDM(Ni + V) | 110 | 180 |
| Conversion | 100 | 97 |

The results in Table 2 indicate that the performances of the catalyst according to the invention and the comparative catalyst prepared as described above are roughly equal to the performance of the commercially available ebullated bed catalyst as to HDS, HDN, HDCCR, and Conversion. However, the removal of contaminant metals is greatly improved in the catalyst according to the invention, both as compared with the commercially available comparative catalyst and as compared with the comparative catalyst prepared above.

EXAMPLE 2
Preparation of a catalyst in accordance with U.S. Pat. No. 4,888,316

The spent hydrodesulphurisation catalyst used in Example 1 was ground to a particle size of less than 20 micron. Because the spent catalyst still contained coke, the grinding had to be carried out very carefully.

3300 grams of the ground spent catalyst were mixed with 2500 grams of alumina. To the thus obtained mixture were added 15 grams of 54 wt. % nitric acid dissolved in 1500 grams of water, after which the thus obtained mixture was kneaded. After 12 minutes 250 grams of water were added, and the mixture was kneaded again. This action was repeated a few times, until the mixture was extrudable. The thus obtained mixture was extruded using a Welding extruder to form extrudates with a diameter of 1 mm. The extrudates were dried overnight in air at a temperature of 120° C., and subsequently calcined for 1 hour at a temperature of 600° C. The thus-obtained catalyst had a SCS of 0.4 lbs/mm, which is totally unacceptable for commercial use. It is also much lower than the SCS of the catalyst according to the invention prepared in Example 1.

Thus, it appears that, apart from the HSE hazards which accompany the grinding of spent catalyst before it is decoked, the process described in U.S. Pat. No. 4,888,316 also leads to the production of a catalyst with an unacceptably low strength.

EXAMPLE 3

This example illustrates a further process for preparing a catalyst in accordance with the present invention.

The spent hydrodesulphurisation catalyst used as starting material in Example 1 was stripped of carbonaceous and sulphurous deposits by subjecting the catalyst to a heat treatment at a temperature of 525° C. for a period of 10 hours in an oxygen-containing atmosphere.

The catalyst was ground to a particle size of less than 20 micron. Then, the ground particles were calcined in air for a period of 1 hour at a temperature of 750° C. 2970 grams of the calcined spent catalyst were mixed with 2489 grams of alumina. To the thus obtained mixture were added 15 grams of 54 wt. % nitric acid dissolved in 1500 grams of water, after which the thus obtained mixture was kneaded. After 12 minutes 250 grams of water were added, and the mixture was kneaded again. This action was repeated a few times, until the mixture was extrudable. The thus obtained mixture was extruded using a Welding extruder to form extrudates with a diameter of 1 mm. The extrudates were dried overnight in air at a temperature of 120° C., and subsequently calcined at a temperature of 600° C.

The resulting catalyst had a micro-MPD of 12.5 nm, a pore volume in pores with a diameter above 100 nm of 0.22 ml/g, a total pore volume as determined by way of mercury intrusion of 0.75 ml/g and a CBD of 0.57 ml/g.

EXAMPLE 4

This example illustrates a further process for preparing a catalyst in accordance with the present invention.

The spent hydrodesulphurisation catalyst used as starting material in Example 1 was stripped of carbonaceous and sulphurous deposits by subjecting the catalyst to a heat treatment at a temperature of 525° C. for a period of 10 hours in an oxygen-containing atmosphere. The catalyst particles were calcined in air for a period of 1 hour at a temperature of 750° C.

The calcined catalyst was ground to a particle size of less than 20 micron. Then, 2970 grams of the calcined spent catalyst were mixed with 2489 grams of alumina. To the thus obtained mixture were added 15 grams of 54 wt. % nitric acid dissolved in 1500 grams of water, after which the thus obtained mixture was kneaded. After 12 minutes 250 grams of water were added, and the mixture was kneaded again. This action was repeated a few times, until the mixture was extrudable. The thus obtained mixture was extruded using a Welding extruder to form extrudates with a diameter of 1 mm. The extrudates were dried overnight in air at a temperature of 120° C., and subsequently calcined at a temperature of 600° C.

The resulting catalyst had a micro-MPD of 12 nm, a pore volume in pores with a diameter above 100 nm of 0.064 ml/g, a total pore volume as determined by way of mercury intrusion of 0.55 ml/g and a CBD of 0.69 ml/g.

I claim:

1. A process for preparing a hydroprocessing catalyst which comprises
    (a) subjecting a spent hydroprocessing catalyst comprising at least a hydrogenation metal component on a support comprising at least 50 wt. % of alumina and carbonaceous and sulphurous deposits is subjected to a thermal treatment at a temperature in the range of 200° to 600° C. in an oxidising atmosphere to remove at least part of the carbonaceous and sulphurous deposits from the catalyst,
    (b) grinding the hydroprocessing catalyst from which at least part of the carbonaceous and sulphurous deposits have been removed form particles with a particle size of 300 microns or less,
    (c) mixing the ground hydroprocessing catalyst with at least one additive, and
    (d) shaping the mixture of additive and ground hydroprocessing catalyst to form particles of a new hydroprocessing catalyst, wherein the product of at least one of the steps (a) through (d) is subjected to a high-temperature calcination step carried out at a temperature in the range of 550–1000° C. for a period of time sufficient to increase the MPD of the spent catalyst by at least 0.5 nm.

2. The process according to claim 1 in which the product of step (a) is subjected to the high-temperature calcination step, and the thus obtained product is processed further.

3. The process according to claim 1 in which the product of step (d) is subjected to the high-temperature calcination step.

4. The process according to claim 1 in which both a binder and an additive are added to the catalyst composition in step (c).

5. The process according to claim 4, wherein the additive is bauxite, diatomaceous earth, kaolin, or sepiolite.

6. The process of claim 1 wherein an alumina binder is added to the catalyst composition in step (c).

7. A hydroprocessing catalyst prepared by the process of claim 1.

* * * * *